Feb. 20, 1962     D. H. LARSON     3,021,904
BEAN HARVESTER

Filed July 30, 1959     3 Sheets-Sheet 1

Dale H. Larson, Deceased
By B. Frances Larson, Executrix
INVENTOR.

BY *Clarence A. O'Brien
and Harvey B. Jackson*
Attorneys

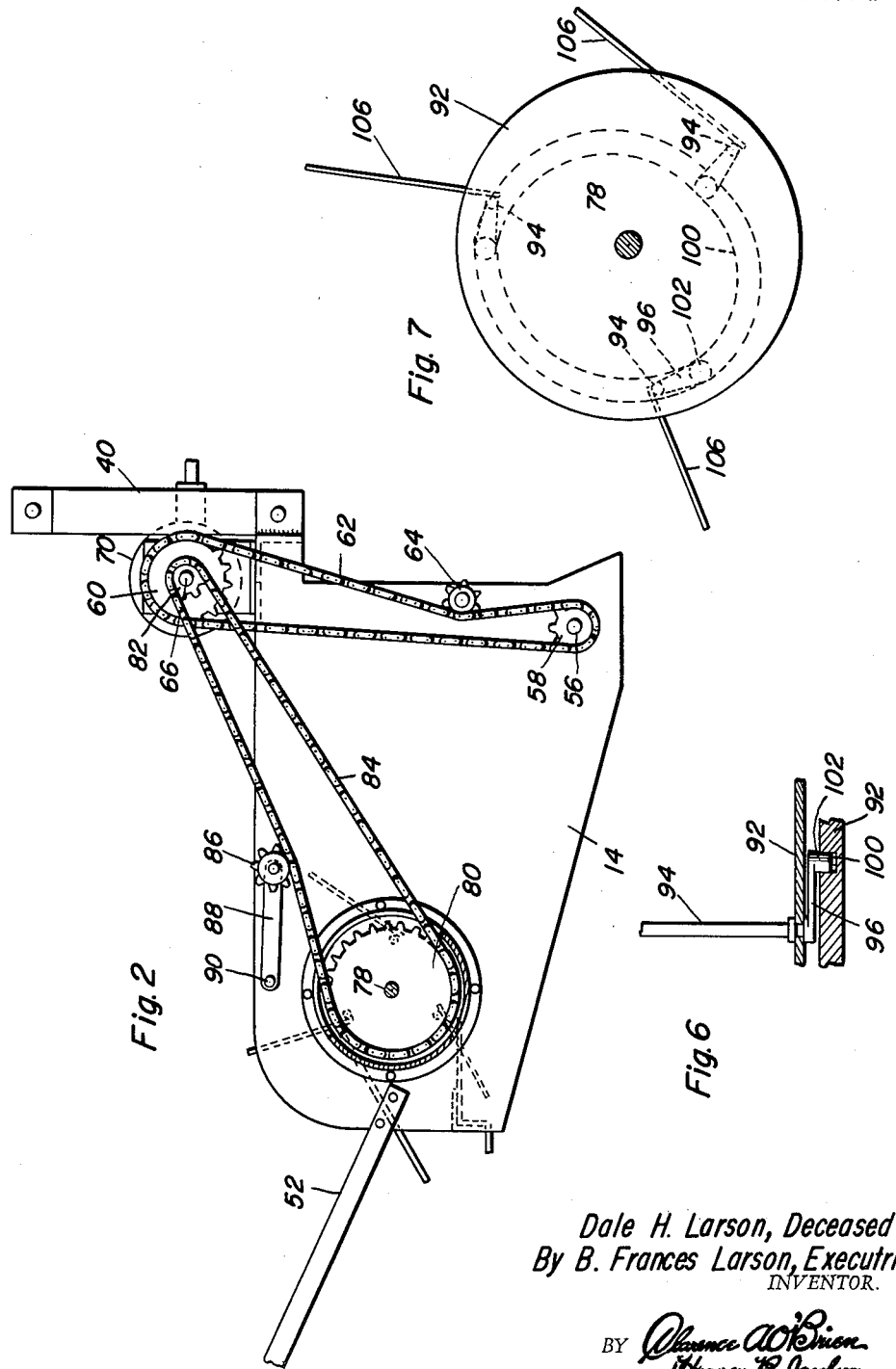

Feb. 20, 1962 D. H. LARSON 3,021,904
BEAN HARVESTER
Filed July 30, 1959 3 Sheets-Sheet 3
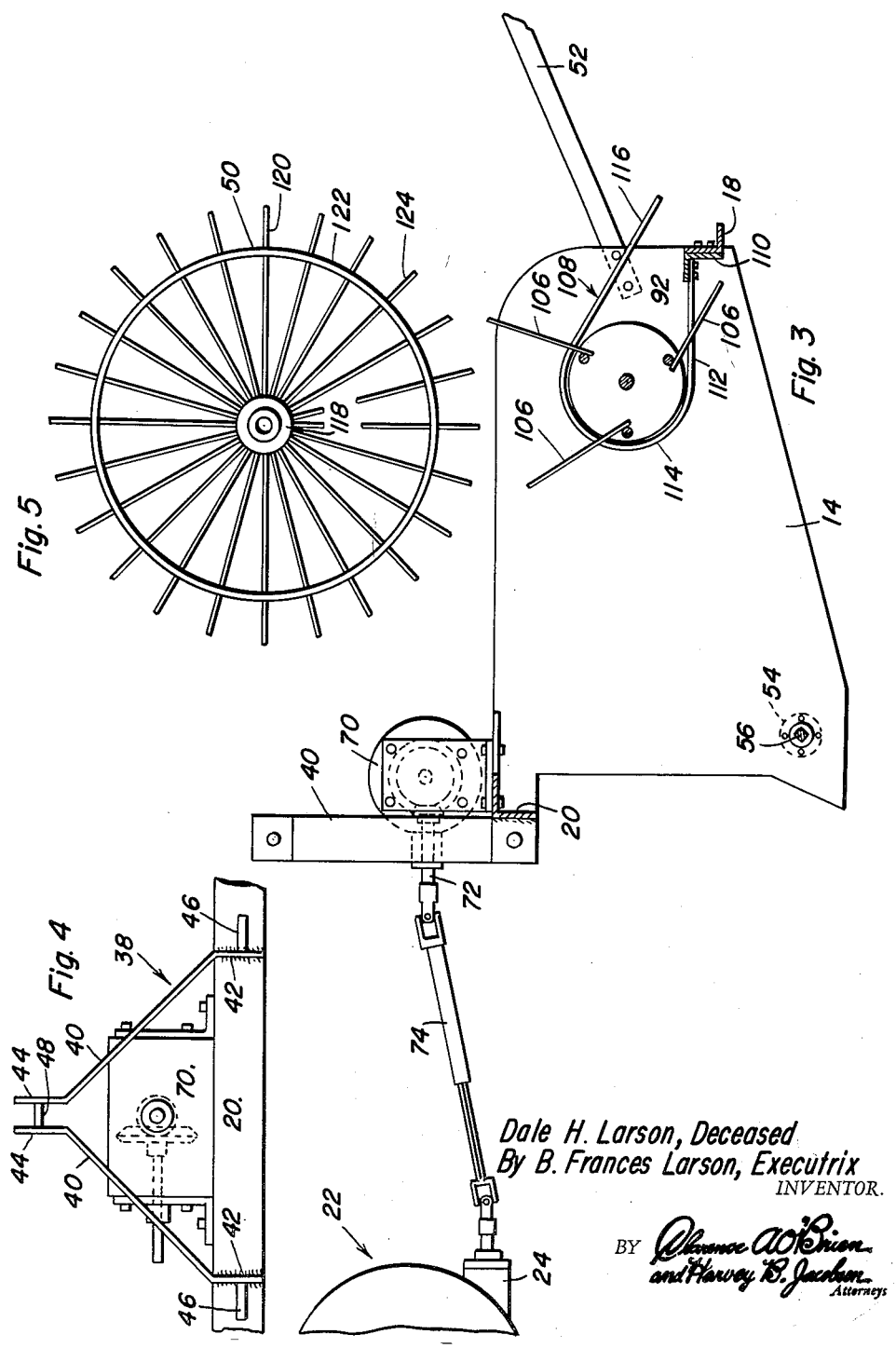
Dale H. Larson, Deceased
By B. Frances Larson, Executrix
INVENTOR.

Patented Feb. 20, 1962

3,021,904
BEAN HARVESTER
Dale H. Larson, deceased, late of Othello, Wash., by B. Frances Larson, executrix, P.O. Box 114, Othello, Wash.
Filed July 30, 1959, Ser. No. 830,655
3 Claims. (Cl. 171—53)

This invention relates in general to new and useful improvements in farm equipment, and more specifically to a novel bean harvester.

In harvesting beans, the entire bean vine is cut and windrowed to dry, after which it is passed through a thresher for the removal of the individual beans from the vines. It will be readily apparent that care must be exercised in cutting the bean vine, otherwise the beans will be shook loose therefrom and lost. Further, it is highly desirable to reduce the amount of dirt accumulated in the bean vines to facilitate the threshing operation.

It is therefore the primary object of this invention to provide a bean harvester which is of a construction that permits the bean vines to be gently pulled up out of the ground and then gently lifted and piled into a single windrowed row.

A further object of the invention is to provide novel means for harvesting bean vines which includes a rotating rod of a polygonal cross-section, preferably square, which rod rotates in a direction opposite to the direction of rotation of the tractor wheels during forward travel of the bean harvester and engages the bean vines to pull the bean vines bodily from the ground, the bar engaging the bean vines adjacent the ground so as not to disturb the individual beans carried thereby.

Another object of the invention is to provide a bean harvester which has a novel drive, the bean harvester being connected to the power take-off of a tractor which tows the bean harvester and including a variable speed transmission in the drive train thereof, the transmission being provided with controls positioned adjacent the operator's seat of the tractor so that the speed of operation of the components of the bean harvester may be readily controlled by the operator of the tractor during the bean harvesting operation.

Bean vines, like many other plants, are planted in rows. At the present time bean harvesting equipment is limited to a two row operation. In view of this, it is a further object of the invention to provide a bean harvester which will efficiently operate to simultaneously harvest four rows of bean vines and windrow the four rows of bean vines into a single windrow, thereby saving the services of a tractor and the operator for the tractor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a fragmentary side elevational view of the bean harvester taken from the right hand side thereof and shows the general arrangement of the various drive components thereof;

FIGURE 3 is a fragmentary vertical sectional view taken substantially upon the plane indicated by the section line 3—3 of FIGURE 1 and shows further the details of construction of the bean harvester;

FIGURE 4 is an enlarged fragmentary elevational view of the forward part of the bean harvester and shows the specific details of the connection with the tractor;

FIGURE 5 is an elevational view of one of the windrower wheels and shows the details thereof;

FIGURE 6 is an enlarged fragmentary sectional view showing the specific details of the cam assembly for pivoting the fingers of the bean vine lifting mechanism; and FIGURE 7 is an enlarged fragmentary vertical sectional view taken substantially upon the plane indicated by the section line 7—7 of FIGURE 1 and shows further the details of the cam assembly for pivoting the lifting fingers.

Figure 1:
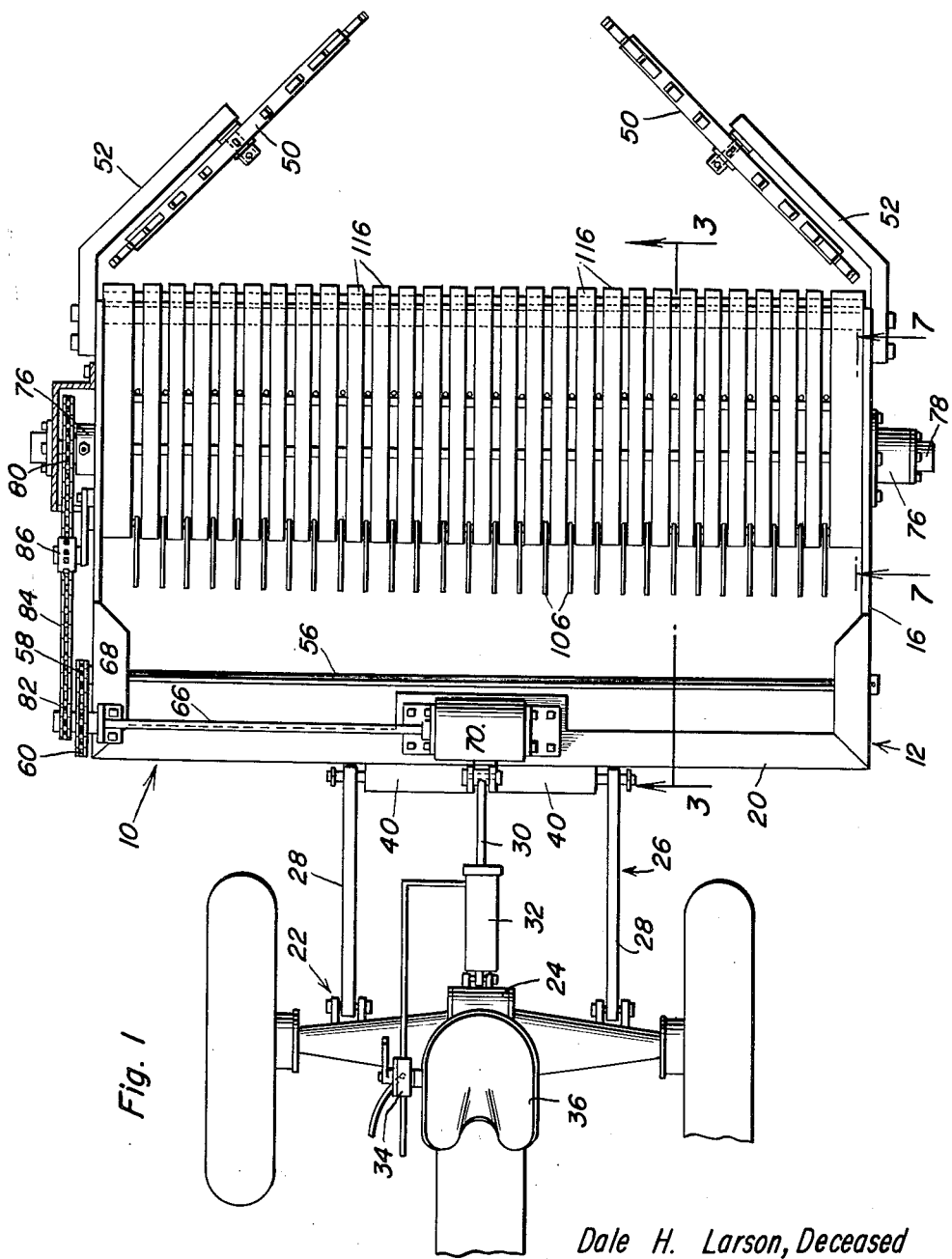
FIGURE 1 is a plan view of the bean harvester which is the subject of this invention, and shows the same attached to the rear portion of the conventional farm tractor for operation therewith.

Referring now to the drawings in detail, it will be seen that there is illustrated in FIGURE 1 the over-all details of the bean harvester which is the subject of this invention, the bean harvester being generally referred to by the reference numeral 10. The bean harvester 10 includes a frame generally referred to by the reference numeral 12. The frame 12 is formed of a right side plate 14 and a left side plate 16 the details of which are best illustrated in FIGURES 2 and 3, respectively. The rear portions of the side plates 14 and 16 are connected together by a transverse frame member 18, as is best shown in FIGURE 3. A generally U-shaped frame member 20, as is best shown in FIGURE 1, extends between and connects together the upper forward parts of the side plates 14 and 16. The frame member 20 is annular in cross-section, as is best illustrated in FIGURE 3.

Referring once again to FIGURE 1 in detail it will be seen that the bean harvester 10 is connected to a conventional farm tractor, generally referred to by the numeral 22. The farm tractor 22 among other components, includes a power take-off 24 and a three lift-arm support system generally referred to by the numeral 26. The lift arm system 26 includes a pair of outer and lower lift arms 28 and a central lift arm 30 which is extensible to the corporation of a hydraulic cylinder 32. The hydraulic cylinder 32 is operated by a control valve 34 which is mounted adjacent the operator's seat 36 of the tractor.

Referring now to FIGURE 4 in particular, it will be seen that a hitch assembly, generally referred to by the numeral 38 is secured to the forward part of the frame member 20. The hitch assembly 38 is formed of a pair of bars 40 which include lower vertical portions 42 directly secured to the transverse frame member 20 in widely spaced relation and a pair of upper closely spaced upright portions 44. Hinge pins 46 are carried by the portions 42 and a hinge pin 48 extends between the portions 44. The lift arms 28 are connected to the hinge pins 46 and the lift arm 30 is connected to the hinge pins 48.

The rear portion of the bean harvester is supported by a pair of windrower wheels 50. The windrower wheels 50 converge rearwardly and are supported at opposite sides of the bean harvester frame by rearwardly extending angular support arms 52 which are rigidly secured to the respective side plates 14 and 16 of the bean harvester frame.

Transversely aligned bearings 54 are carried by the lower forward portions of the plates 14 and 16. A square bar 56 extends between and is rotatably journalled in the bearing 54. The bar 56 extends through the plate 14 and has a drive sprocket 58 secured thereto. The drive sprocket 58 is aligned with the second drive sprocket 60 and is connected thereto by a drive chain 62. An idler sprocket 64 is adjustably carried by the plate 14 to tension the drive chain 62.

The sprocket 60 is mounted on a shaft 66 for rotation, the shaft 66, as is best shown in FIGURE 1, extending from the central portion of the bean harvester to the right side thereof. The right portion of the shaft 66 is journalled in the bearing 68 carried by the frame member 20 and the left end thereof is journalled in a gear box 70 which provides for a right angle drive. The gear box 70 is supported on the transverse frame member 20 and is provided with a drive shaft 72 which is coupled to the power take-off 24 of the tractor 22 by a driveshaft 74 having universal joints at opposite ends thereof. The gear box 70 is provided with a speed change mechanism having a control lever adjacent the operator's seat.

A pair of transversely aligned bearings 76 are carried by the rear central portion of the plates 14 and 16. A shaft 78 extends through and is rotatably journalled in these bearings. A sprocket 80 is mounted on the shaft 78 outwardly of the plate 14 and is aligned with a sprocket 82 carried by the shaft 66. A drive chain 84 is entrained over the sprockets 82 and 84 to drivingly connect the shaft 78 to the shaft 66. An idler sprocket 86 engages an intermediate portion of the drive chain 84 to tension the same. The idler sprocket 86 is carried by a swing arm 88 which is pivotally mounted on the plate 14 as at 90.

A pair of plates 92 are mounted on the opposite end of the shaft 78 within the confines of the plates 14 and 16. While only two plates 92 are described, it is to be understood that additional plates may be spaced transversely of the shaft 78. At least three shafts 94 extend through and are rotatably journalled in the plate 92. Each of the shafts 94 is provided with a crank arm 96 at least at the end thereof adjacent the plate 16. A cam plate 98 is secured to the inner face of the plate 16; the cam plate 98 having a cam track 100 formed in the inner surface thereof. Each of the crank arms 96 has an offset end portion 102 which is disposed in the cam track 100. Thus as the shafts 78 and the plates 92 rotate, the shafts 94 are pivoted.

Each of the shafts 94 carries a plurality of lifting fingers 106. The lifting fingers 106 are arranged in groups spaced transversely of the shafts 94, as is best shown in FIGURE 1. The general arrangement of the lifting fingers 106 as they rotate best illustrated in FIGURE 7, the effect of the cam track 100 and the crank arms 96 being such as to maintain the lifting fingers 106 in a generally upright position as they rotate from the vertical rearwardly so as to assure the rearward movement of bean vines. On the other hand, after the bean vine has been released, the lifting fingers are quickly swung around during the lower part of their travel to assume the proper position for elevating additional bean vines.

In order to provide a suitable support for the bean vines, bands 108 are disposed intermediate each group of lifting fingers 106. The bands 108 are supported from the transverse frame member 18. The lower ends of the bands 108 are connected to a support member 110 which is secured to the frame member 18 in the manner best illustrated in FIGURE 3. It is to be noted that each of the bands 108 includes a horizontal lower portion 112, a generally semi-circular forward portion 114 which extends around the plate 92, and a downwardly and rearwardly sloping upper portion 116.

Each of the windrower wheels 50 includes a hub 118 having a plurality of spokes 120 radiating therefrom. The spokes 120 are connected together by a rim 122 which is disposed inwardly of the outer ends of the spokes 120. Thus the spokes 120 terminate outwardly of the trim 122 in a plurality of pick up fingers 124.

Operation

In the operation of the bean harvester 10, as it is towed behind the tractor 22, the bar 56 is rotated in a direction opposite to the direction of rotation of the tractor wheels during forward movement of the bean harvester. The bar 56 is disposed closely adjacent to the ground and passes under the bean vines and engages the stalks thereof. The action of the bar 56 in engagement with the stalks of the bean vines is to bodily pull the bean vines out of the ground. This is a gentle operation since the bar 56 engages only the stalks of the bean vines and thus does not disturb the beans carried thereby. At the same time, the bar 56 will engage the roots of the bean vines as they pass upwardly thereover and will knock a major portion of the dirt therefrom.

After the bean vines have been pulled from the ground, they move over the bar 56 and are engaged by the lifting fingers 106. The lifting fingers 106 gently pick up the bean vines and move them upwardly and then rearwardly at which time the dirt and other foreign matter is released from the bean vines. The bean vines then move downwardly behind the main part of the bean harvester 10 and are engaged by the windrower wheels 50. The windrower wheels 50 pick up the outermost ones of the bean vines and gently rotate them into overlying relation to the central ones thus placing all of the bean vines in a bean windrow. It is to be understood that the bean harvester 10 is preferably of a width to harvest four rows of beans. Thus the windrowed bean vines will be relatively large and will provide ample material for the operation of a combine in a threshing operation. Further, since the bean vines have been gently pulled and gently handled, while at the same time removing the foreign matter therefrom, it will be seen that there will be little loss in the harvesting operation and at the same time the threshing operation will be of the simplest form.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bean harvester for attachment to a farm tractor comprising a frame, means disposed forwardly on the frame for attachment to a tractor, a horizontally disposed rotatable polygonal bar journaled on the frame, a transverse shaft journaled on the frame rearwardly of the bar, drive means mounted on the frame and adapted to be driven from the power take-off of a tractor, means connecting the drive means to the bar and the shaft for drivingly rotating the bar and shaft, a plurality of circular disks mounted on said shaft for rotation therewith, a plurality of circumferentially spaced fingers pivotally mounted on the disks for rotation therewith, each finger having an offset arm thereon, cam means engaging the offset arms for pivoting the fingers in relation to the disks during rotation of the disks and orientating the fingers in various angular relations to the disks during rotation and disposing the fingers vertically as the disk moves them over the top and rearwardly for moving bean vines pulled out of the ground surface by the rotating bar upwardly and rearwardly while loosening dirt therefrom, and windrowing means mounted on the frame and disposed rearwardly of the fingers, said windrowing means including freely rotatable wheel members having radial tines thereon for moving the bean vines into a windrow.

2. The structure as defined in claim 1 wherein the fingers connected to the disk are spaced laterally from each other with the area between the fingers being occupied by a plurality of strap-like bands, the upper portion of each band extending rearwardly and downwardly for stripping bean vines from the fingers and discharging them rearwardly of the rotating disk, the lower end portion of the bands extending rearwardly and being attached to the frame for support thereof.

3. The structure as defined in claim 2 wherein said cam means includes a cam plate mounted rigidly in relation to the frame, a cam track on the plate, said offset arm having projection riding in the cam track for pivoting the fingers for maintaining an upright position during the movement of the fingers over the top and towards the rear of the disk.

References Cited in the file of this patent

UNITED STATES PATENTS

| | | |
|---|---|---|
| 2,432,956 | Walz et al. | Dec. 16, 1947 |
| 2,603,053 | Lipe et al. | July 15, 1952 |
| 2,718,110 | Butler | Sept. 20, 1955 |
| 2,815,636 | Reilly | Dec. 10, 1957 |